Jan. 31, 1950     W. L. PEARCE     2,496,172
PIPE HOLDING SLIP
Filed Dec. 5, 1945     3 Sheets-Sheet 1
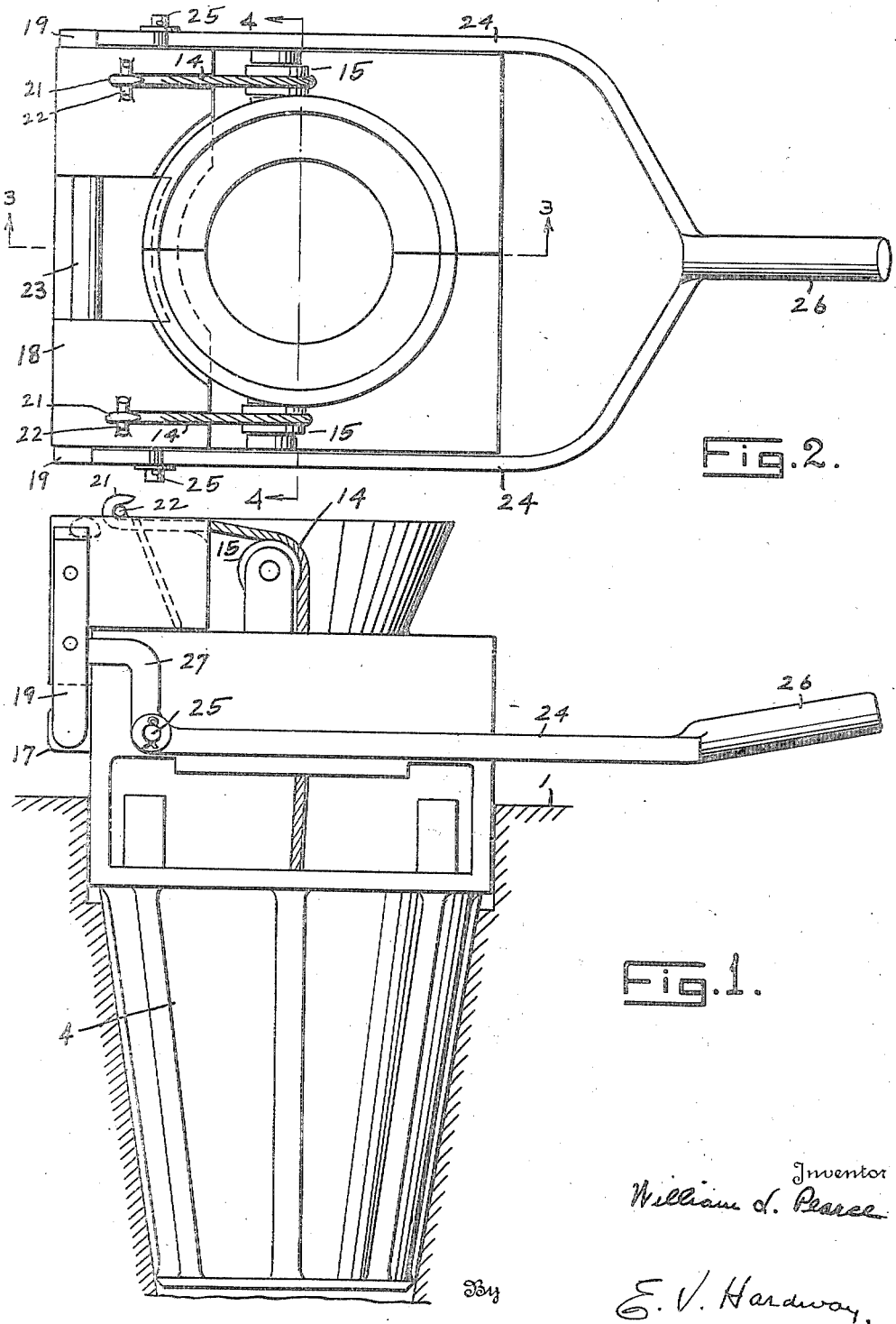
Inventor
William L. Pearce
By E. V. Hardway,
Attorney

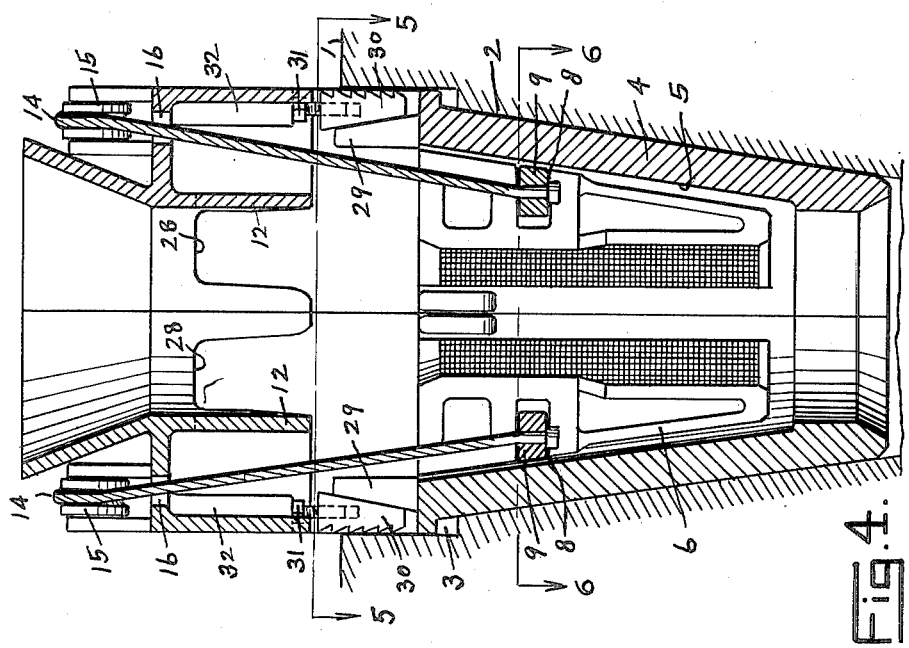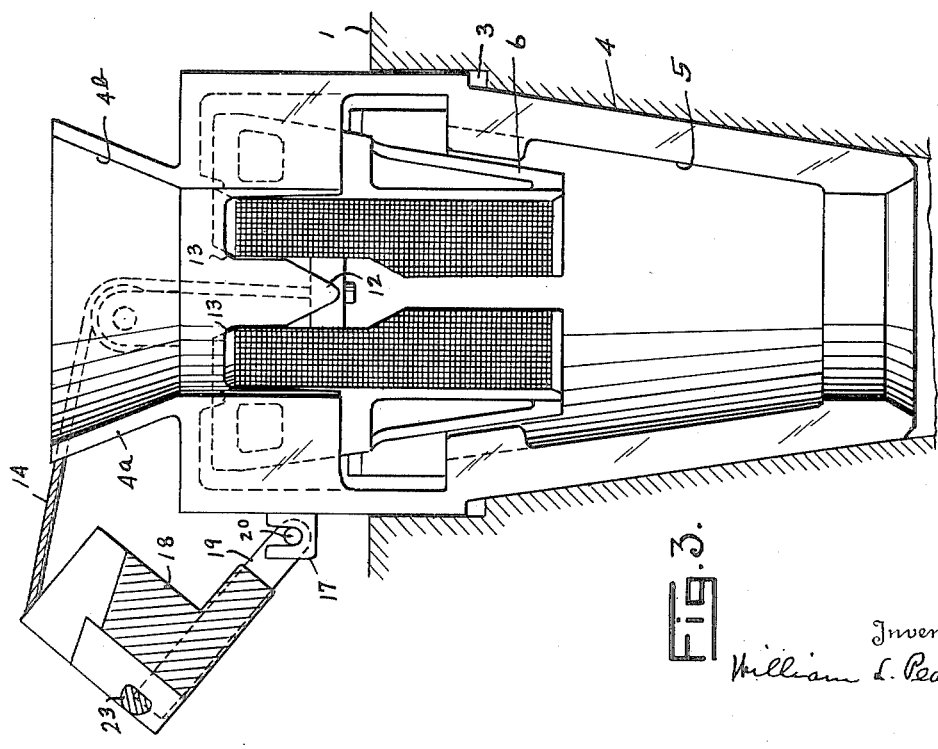

Inventor
William L. Pearce
By E. V. Hardway
Attorney

Patented Jan. 31, 1950

2,496,172

UNITED STATES PATENT OFFICE 2,496,172

PIPE HOLDING SLIP

William L. Pearce, Houston, Tex.

Application December 5, 1945, Serial No. 632,889

3 Claims. (Cl. 24—263)

This invention relates to a pipe holding slip.

An object of the invention is to provide a slip of the character described specially designed for use in the handling of pipe and the like while lowering the same into or withdrawing the same from a well and the invention relates primarily to means for controlling the movement of the slip segments.

Another object of the invention is to provide a vertically elongated slip cage or housing adapted to seat in a drive bushing of a rotary table or other seat, and of a length to extend above the table so that the slip segments may be actuated into upper, or released, position and there suspended, or may be readily moved into pipe engaging position.

It is a further object of the invention to provide a counter balancing weight which is mounted on, and which is readily removable from, the housing and which is connected to the respective pairs, or sections, of slip segments by means of flexible lines, or cables, and whereby the movement of the slip segments to pipe engaging position or to released position may be readily controlled.

It is a further object of the invention to provide manually operable means for moving the counter balancing weight out of balance whereby the slip segments will be automatically elevated by said weight.

The invention also embodies means whereby the housing may be locked, or held, against unseating from said seat.

With the above and other objects in view the invention has particular relation to certain novel features of construction, operation and arrangement of parts, an example of which is given in this specification and illustrated in the accompanying drawings, wherein—

Figure 1 is a side view of the complete slip.

Figure 2 is a plan view.

Figure 3 is an elevational view showing the inside of one of the housing sections and the slip section therein taken on the line 3—3 of Figure 2.

Figure 4 is a cross-sectional view taken on the line 4—4 of Figure 2.

Referring now more particularly to the drawings wherein like numerals of reference designate the same parts in each of the figures, the numeral 1 designates a suitable support, such as a drive bushing of a rotary table of the well known type of rotary drilling machine. The drive bushing has a downwardly tapering seat 2 whose upper end is formed with a rectangular recess 3 which is preferably square in horizontal cross-section.

There is a cage, or housing, designated generally by the numeral 4 and whose lower end is downwardly tapered and thus adapted to fit into the seat 2. As shown this cage is formed of two vertical sections although the number of cage sections is optional.

Figure 6:
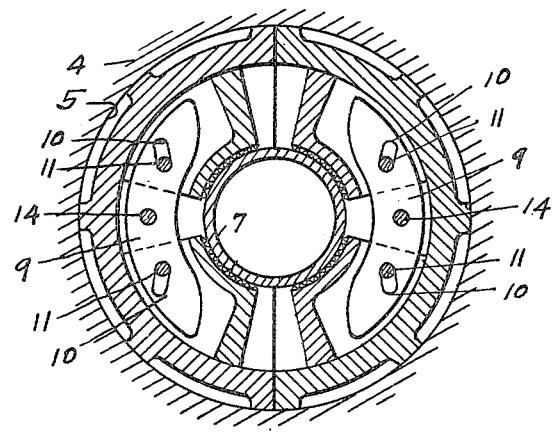
Figure 6 is a cross-sectional view taken on the line 6—6 of Figure 4.

The walls of the cage, or housing, which fit into the outside and inside surfaces of the seat 2, are approximately parallel so that the inside of the cage also converges downwardly forming a seat 5 on which the slip segments 6 ride. These slip segments are wedge shaped and their outer sides taper downwardly and conform to the taper of the seat 5. They are arcuate in horizontal, cross-sectional, contour, their inner sides being thus shaped to fit closely about the pipe 7 to be held. The inner sides of the slip segments are serrated so as to securely grip the pipe to be held. The slip segments are connected in pairs, or sections, as more clearly shown in Figure 6. As shown one pair, or section, of slip segments is mounted in each cage section, as more clearly shown in Figures 3 and 6. Adjacent each upper end each segment is provided with a deep external groove 8, the grooves of the respective segments of each pair being transversely aligned. Arcuate yokes 9, are fitted into the grooves 8 of the respective sections, or pairs, of slip segments. The respective ends of the yokes have the elongated slots 10, 10, the slots of each yoke diverging slightly outwardly, as shown in Figure 6, and there are the respective pins 11, 11, one for each slot, anchored to the corresponding slip segment and extending through the corresponding slot. The slots of each pair diverge at such angles as to permit the slip segments to expand upon upward movement of the segments and to contract, or move inwardly, upon downward movement of the segments.

The upper portion of the housing 4 is rectangular, in cross-section to fit in the recess 3 and has an upwardly directed extension 4a which is reduced in diameter and its inner side is formed with a downwardly converging guide 4b to prevent the outside couplings of the pipe, or casing, 7 from hanging thereon. The upper end of each section of the cage has a downwardly pointed wedge shaped expander 12 arranged between the slip segments of that section of the cage and upon upward movement of said segments these expanders will co-operate with the corresponding tapering faces 13, 13 at the upper inner corners of adjacent segments whereby the segments of each pair, or section, of the slip will be caused to move apart and the corresponding pins 11 moving outwardly along the corresponding slots 10 will effect a uniform expansion of the slip segments.

Lift cables 14, 14 have their lower ends connected to the corresponding yokes 9 between the segments of each pair, as shown in Figures 3 and 4, and mounted on the upper ends of the respective sections of the cage, or housing, are the sheaves 15, 15 over which said cables operate, said cables passing through suitable openings 16, 16 in the cage provided to receive them.

Fixed on corresponding sides of the cage sections, above the level of the rotary table, are the U-shaped brackets, as 17, 17, and between these brackets there is a counter balancing weight 18 which has the depending arms 19, 19 fixed thereto with inwardly turned pintles 20 carried by said arms and working in said brackets 17 whereby the weight is pivotally supported in upright position, as shown in Figures 1 and 2. The upper ends of the cables 14 have hooks 21, 21 attached thereto which are detachably engaged through the eyes 22, 22 on the upper side of the weight 18.

The central portion of the weight is countersunk and a grip member 23 extends across said countersunk portion, as shown in Figures 2 and 3, and the inner side of the weight is formed arcuate to partially surround the extension 4a of the cage, when the weight is in upright position, as illustrated in Figures 2 and 3.

When the slip segments are in active position, as shown in Figures 4 and 6, the counter balancing weight 18 will be in its upper position, as shown in Figures 1 and 2, so as to allow sufficient slack on the cables to allow the slip segments to move downwardly by gravity into said active position. When the slip segments are in this active position they will securely grip the string of pipe 7 and hold it suspended in the well bore.

There is a yoke comprising the side arms 24, 24 which embrace the housing 4 and are pivotally mounted, at one end, on the studs 25, 25 extending out laterally from opposite sides of the housing 4. These side arms converge at their outer ends and unite in a common grip member 26. The pivoted ends of these arms are upturned and said upturned portions 27 are rearwardly turned and rest against the corresponding arms 19.

If it now be desired to release the slip from a string of pipe said string is first slightly elevated by well known appliances for that purpose so as to take the load of the string off of the segments and the grip member 26 may then be elevated causing the upturned portion 27 to move the weight 18 outwardly out of balance and said weight will fall by gravity into the position indicated in Figure 3 thus elevating the slip segments and causing them to move outwardly away from the pipe to release it and said segments will move on upwardly until they contact the stops 28, 28 at the upper end of the housing, as indicated in Figure 3.

When it is desired to again grip and hold the pipe preparatory to adding another section thereto or breaking out a section therefrom the workman may grasp the grip member 13 and swing the counter balancing weight into upright position, as shown in Figures 1 and 2, with little effort and this will allow the slip segments to simultaneously drop by gravity into their lower, or active, position, as shown in Figures 4 and 6.

Figure 5:
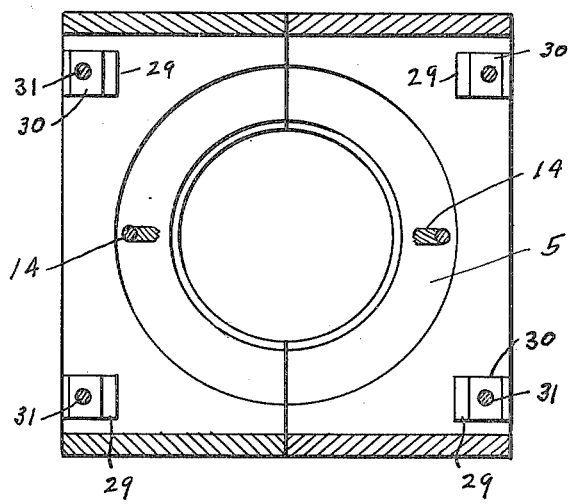
Figure 5 is a cross-sectional view taken on the line 5—5 of Figure 4.

Provision has been made for holding the cage, or housing, 4 against upward movement in its seat. For this purpose there are the upstanding guides 29 carried by the cage, or housing, and spaced inwardly from the drive bushing and whose outer sides taper downwardly and outwardly and working against these tapering sides are the wedges 30 whose outer faces are serrated to engage the opposing sides of the drive bushing, as shown in Figures 4 and 5.

Threaded into the upper ends of the wedges 30 are the jack screws 31 and on the inside of the top portion of the cage, or housing, 4 are the vertical ribs 32 which overhang said jack screws, as shown in Figure 4.

When the slip is seated in the seat 2 the jack screws 31 may be screwed upwardly operating against the lower ends of the ribs 32 to force the wedges downwardly and outwardly causing their teeth to engage the bushing walls to securely hold the slips in the bushing seat.

The drawings and description disclose what is now considered to be a preferred form of the invention by way of illustration only while the broad principle of the invention will be defined by the appended claims.

What I claim is:

1. In a slip for suspending pipe, and the like, in a well; a housing adapted to fit into a seat in a drive bushing, sheaves mounted one on each side of the housing, a counter-balancing weight having depending spaced arms fixed thereto, the lower ends of said arms being pivotally connected with the housing, cables secured at one end to the weight and working over said sheaves and whose other ends extend down into the housing to be connected to pipe-engaging means therein whereby the weight will be maintained in an upright position, a yoke comprising side arms which embrace the housing and are pivotally mounted at one end on opposite sides of the housing, grip means on the forward ends of the yoke arms, the pivoted ends of the arms being upturned and said upturned portions being rearwardly turned and resting against the corresponding weight arms, whereby upon upward movement of the yoke the weight arms and weight will be forced rearwardly and overbalanced to cause the weight to descend.

2. In a slip for suspending pipe, and the like, in a well; a housing adapted to fit into a downwardly tapering seat of a drive bushing, sheaves mounted on opposite sides of the housing, a counter-balancing weight having depending spaced arms fixed thereto, a grip member on the weight, cables secured at one end to the weight and working over said sheaves and whose other ends extend down into the housing to be connected to pipe-engaging means therein whereby said weight will be maintained in substantially upright position, a yoke comprising arms which embrace the housing and are pivotally mounted, at one end on opposite sides of the housing, the pivoted ends of the arms being upturned and said upturned portions being rearwardly directed and resting against the corresponding weight arms whereby upon elevation of the forward end of the yoke said weight will be forced off of center and unbalanced and will move downwardly.

3. In a slip for suspending pipe, and the like, in a well; a tubular housing adapted to fit into a downwardly tapering seat of a drive bushing, sheaves mounted on the housing, one on each side, U-shaped brackets fixed on corresponding sides of the housing near the upper end of the housing, a counter-balancing weight between the brackets having depending spaced arms fixed thereto, inwardly turned spindles carried by the arms and working in said brackets whereby the weight may be pivotally supported in upright position, a grip member on the weight, cables secured at one end to the weight and working over said sheaves and whose other ends extend down into the housing to be connected to pipe-engaging means therein, a yoke comprising side arms which embrace the housing and are pivotally mounted, at one end, on opposites of the housing, a common grip member mounted on the forward ends of the yoke arms, the pivoted ends of the arms being upturned and said upturned portions being rearwardly turned and resting against the corresponding weight arms.

WILLIAM L. PEARCE.

REFERENCES CITED

The following references are of record in the file of this patent:

UNITED STATES PATENTS

| Number | Name | Date |
|---|---|---|
| 1,733,010 | Green | Oct. 22, 1929 |
| 1,754,344 | Aloi | Apr. 15, 1930 |
| 1,966,906 | Standlee | July 17, 1934 |
| 1,999,519 | Standlee | Apr. 30, 1935 |
| 2,051,998 | Monroe | Aug. 25, 1936 |
| 2,068,217 | Abegg | Jan. 19, 1937 |
| 2,156,384 | Fluellen | May 2, 1939 |
| 2,208,926 | Fluellen | July 23, 1940 |